US011062516B2

(12) United States Patent
Greenberg et al.

(10) Patent No.: US 11,062,516 B2
(45) Date of Patent: *Jul. 13, 2021

(54) AUGMENTED REALITY BASED HORTICULTURAL CARE TRACKING

(71) Applicant: iUNU, Inc., Seattle, WA (US)

(72) Inventors: Adam Phillip Takla Greenberg, San Francisco, CA (US); Matthew Charles King, Seattle, WA (US)

(73) Assignee: IUNU, INC., Seattle, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/891,110

(22) Filed: Feb. 7, 2018

(65) Prior Publication Data
US 2019/0244428 A1   Aug. 8, 2019

(51) Int. Cl.
G06T 19/00 (2011.01)
G06Q 50/02 (2012.01)
G06T 7/00 (2017.01)
G06Q 10/06 (2012.01)
A01G 7/06 (2006.01)

(52) U.S. Cl.
CPC ............ *G06T 19/006* (2013.01); *A01G 7/06* (2013.01); *G06Q 10/06* (2013.01); *G06Q 50/02* (2013.01); *G06T 7/001* (2013.01); *G06K 2209/17* (2013.01)

(58) Field of Classification Search
None
See application file for complete search history.

(56) References Cited

U.S. PATENT DOCUMENTS

| 5,841,883 A | 11/1998 | Kono et al. |
| 7,013,284 B2 * | 3/2006 | Guyan ............. G06Q 10/06311 705/4 |
| 7,184,846 B2 | 2/2007 | Albright et al. |
| 7,711,576 B1 | 5/2010 | Duett et al. |
| 8,145,330 B2 | 3/2012 | Emoto |

(Continued)

FOREIGN PATENT DOCUMENTS

| EP | 2736318 A1 | 6/2014 |
| JP | 2011103870 A | 6/2011 |

(Continued)

OTHER PUBLICATIONS

Final Office Action for U.S. Appl. No. 15/271,569, dated Apr. 24, 2018, 18 pages.

(Continued)

*Primary Examiner* — Jeffrey J Chow
(74) *Attorney, Agent, or Firm* — Han Santos, PLLC

(57) ABSTRACT

An augmented reality-based horticultural care tracking system to collect information about plants on a per plant or near per plant basis in order to identify issues and generate itineraries that include task lists for remedial courses of actions is disclosed. A network-enabled augmented reality device can be employed by operators of various growing operations in order to overlay digital information such as tasks, images, and related information in a real-time environment. The augmented reality device can communicate with administrative personnel at an operating station and/or intermediate servers in the network in order to send and receive status updates and notifications to properly execute the tasks in the itinerary and evaluate the courses of actions' efficacy.

20 Claims, 5 Drawing Sheets

(56) References Cited

U.S. PATENT DOCUMENTS

| | | |
|---|---|---|
| 8,594,375 B1 | 11/2013 | Padwick |
| 8,613,158 B2 | 12/2013 | Conrad |
| 8,850,742 B2 | 10/2014 | Dubé |
| 9,565,812 B2 | 2/2017 | Wilson |
| 9,603,316 B1 | 3/2017 | Mansey et al. |
| 9,779,442 B1 | 10/2017 | Cimic et al. |
| 10,002,375 B1 | 6/2018 | Scythes et al. |
| 2003/0227487 A1 | 12/2003 | Hugh |
| 2004/0231240 A1 | 11/2004 | Kuiper et al. |
| 2005/0072862 A1 | 4/2005 | Skinner |
| 2006/0196116 A1 | 9/2006 | Zettl |
| 2007/0065857 A1 | 3/2007 | Glaser et al. |
| 2007/0289207 A1 | 12/2007 | May et al. |
| 2008/0066072 A1 | 3/2008 | Yurekli et al. |
| 2009/0005247 A1* | 1/2009 | Spiegel ............ A01N 25/00 504/116.1 |
| 2009/0132543 A1 | 5/2009 | Chatley et al. |
| 2009/0164741 A1 | 6/2009 | Takaki |
| 2010/0305966 A1* | 12/2010 | Coulter ............ G06Q 10/04 705/2 |
| 2011/0090960 A1 | 4/2011 | Leontaris et al. |
| 2011/0137757 A1 | 6/2011 | Paolini et al. |
| 2011/0196710 A1 | 8/2011 | Rao |
| 2012/0003728 A1 | 1/2012 | Lanoue et al. |
| 2012/0109387 A1 | 5/2012 | Martin et al. |
| 2012/0249741 A1* | 10/2012 | Maciocci ............ G06F 3/011 348/46 |
| 2013/0006401 A1 | 1/2013 | Shan |
| 2013/0185108 A1 | 7/2013 | Bainbridge et al. |
| 2013/0191836 A1 | 7/2013 | Meyer |
| 2013/0235183 A1 | 9/2013 | Redden |
| 2013/0332205 A1 | 12/2013 | Friedberg et al. |
| 2014/0026474 A1 | 1/2014 | Kulas |
| 2014/0035752 A1 | 2/2014 | Johnson |
| 2014/0115958 A1 | 5/2014 | Helene et al. |
| 2014/0154729 A1 | 6/2014 | Leyns et al. |
| 2014/0168412 A1* | 6/2014 | Shulman ............ H04N 7/18 348/89 |
| 2014/0176688 A1 | 6/2014 | Ibamoto |
| 2014/0200690 A1 | 7/2014 | Kumar |
| 2014/0288850 A1 | 9/2014 | Avigdor et al. |
| 2014/0324490 A1 | 10/2014 | Gurin |
| 2015/0015697 A1 | 1/2015 | Redden et al. |
| 2015/0026092 A1* | 1/2015 | Abboud ............ G06Q 30/0281 705/346 |
| 2015/0120349 A1* | 4/2015 | Weiss ............ G06Q 10/06311 705/7.13 |
| 2015/0131867 A1 | 5/2015 | Lin et al. |
| 2015/0185995 A1 | 7/2015 | Shoemaker et al. |
| 2015/0227707 A1* | 8/2015 | Laws ............ G06F 19/3418 705/2 |
| 2015/0230409 A1 | 8/2015 | Nicole et al. |
| 2015/0261803 A1 | 9/2015 | Song et al. |
| 2015/0295877 A1* | 10/2015 | Roman ............ H04W 4/029 709/203 |
| 2016/0026940 A1 | 1/2016 | Johnson |
| 2016/0050840 A1 | 2/2016 | Sauder et al. |
| 2016/0050862 A1 | 2/2016 | Walliser |
| 2016/0086032 A1 | 3/2016 | Pickett |
| 2016/0127599 A1 | 5/2016 | Medicherla et al. |
| 2016/0140868 A1* | 5/2016 | Lovett ............ G09B 19/0053 434/118 |
| 2016/0148104 A1 | 5/2016 | Itzhaky et al. |
| 2016/0205872 A1 | 7/2016 | Chan et al. |
| 2016/0216245 A1 | 7/2016 | Sutton |
| 2016/0239709 A1 | 8/2016 | Shriver |
| 2016/0278300 A1 | 9/2016 | Clendinning et al. |
| 2016/0345517 A1 | 12/2016 | Cohen et al. |
| 2017/0030877 A1 | 2/2017 | Miresmailli et al. |
| 2017/0038749 A1 | 2/2017 | Mewes et al. |
| 2017/0039657 A1 | 2/2017 | Honda et al. |
| 2017/0064912 A1 | 3/2017 | Tabakman |
| 2017/0068924 A1* | 3/2017 | Tanaka ............ G06Q 10/063114 |
| 2017/0286772 A1 | 10/2017 | Workman et al. |
| 2017/0300846 A1* | 10/2017 | Harwood ............ G06Q 10/063112 |
| 2017/0374323 A1 | 12/2017 | Gornik |
| 2018/0039261 A1 | 2/2018 | Haller et al. |
| 2018/0276504 A1 | 9/2018 | Yamaguchi et al. |
| 2018/0325051 A1 | 11/2018 | Brandao et al. |
| 2019/0034736 A1 | 1/2019 | Bisberg et al. |
| 2019/0212316 A1 | 7/2019 | Sutton |

FOREIGN PATENT DOCUMENTS

| | | |
|---|---|---|
| KR | 20130005540 A | 1/2013 |
| KR | 20140077513 A | 6/2014 |
| KR | 20140114089 A | 9/2014 |
| KR | 20150000435 A | 1/2015 |
| WO | 2011115666 A2 | 9/2011 |
| WO | 2014100502 A1 | 6/2014 |

OTHER PUBLICATIONS

Non-Final Office Action for U.S. Appl. No. 15/271,569, dated Jan. 23, 2018, 33 pages.

International Search Report and Written Opinion for PCT Application No. PCT/US2017/052800 dated Jan. 16, 2018, 14 pages.

International Search Report and Written Opinion for PCT Application No. PCT/US2017/052805 dated Jan. 9, 2018, 14 pages.

Augustin et al., "A framework for the extration of quantitative traits from 2D images of mature *Arabidopsis thaliana*," Machine Vision and Applications, vol. 27, Issue 5 (Oct. 16, 2015), pp. 647-661.

Nagasai, et al., "Plant Disease Identification using Segmentation Techniques," International Journal of Advanced Research in Computer and Communication Engineering, vol. 4, Issue 9 (Oct. 5, 2015), pp. 411-412.

Patil et al., "A Survey on Methods of Plant Disease Detection," International Journal of Science and Research (IJSR) vol. 4, Issue 2 (Feb. 2015), pp. 1392-1396.

Sannakki et al., "Comparison of Difference Leaf Edge Detection Algorithms Using Fuzzy Mathematical Morphology," International Journal of Innovations in Engineering and Technology (IJIET), vol. 1, Issue 2 (Aug. 2012), pp. 15-21.

U.S. Appl. No. 15/271,569, Office Action, dated Sep. 19, 2018, 10 pages.

U.S. Appl. No. 15/271,630, Office Action, dated Sep. 26, 2018, 20 pages.

U.S. Appl. No. 15/271,727, Office Action, dated Oct. 2, 2018, 22 pages.

International Application No. PCT/US2019/013927, International Search Report and Written Opinion dated May 7, 2019, 9 pages.

Jean et al. AR Plants: Herbal Plant Mobile Application utilizing Augmented Reality. Dec. 2017. [retrieved on Apr. 1, 2019]. Retrieved from the Internet<URL:http://delivery.acm.org/10.1145/3170000/3168426/>. entire document.

U.S. Appl. No. 15/271,658, Final Office Action dated Jul. 29, 2019, 31 pages.

U.S. Appl. No. 15/271,630, Final Office Action dated Apr. 17, 2019, 11 pages.

U.S. Appl. No. 15/271,727, Final Office Action dated Apr. 25, 2019, 22 pages.

Vaglica, "Shrub Pruning Dos and Donts", Aug. 3, 2016, https://www.thisoldhouse.com/ideas/shrub-pruning-dos-and-donts (Year: 2016).

European Patent Application No. 17853934.2, Extended European Search Report dated Dec. 13, 2019, 10 pages.

Funk et al: "Interactive worker assistance", Pervasive and Ubiquitous Computing, ACM, 2 Penn Plaza, Suite 701 New York NY 10121-0701 USA, Sep. 12, 2016 (Sep. 12, 2016), pp. 934-939, XP058279126, DOI: 10.1145/2971648.2971706 ISBN: 978-1-4503-4461-6.

Nagasai et al: "Plant Disease Identification using Segmentation Techniques", International Journal of Advanced Research in Computer and Communication Engineering, vol. 4, No. 9, Sep. 1, 2015 (Sep. 1, 2015), XP55500057, DOI: 10.17148/IJARCCE.2015.4988.

Sagar Patil et al: "A Survey on Methods of Plant Disease Detection", International Journal of Science and Research, vo 1.4, No. 2, Feb. 1, 2015 (Feb. 1, 2015), pp. 1392-1396, XP55500036.

(56) References Cited

OTHER PUBLICATIONS

U.S. Appl. No. 15/271,630, Notice of Allowance, dated Nov. 20, 2019, 22 pages.

U.S. Appl. No. 15/271,658, Non Final Office Action dated Jan. 8, 2020, 36 pages.

U.S. Appl. No. 15/271,749, Non Final Office Action dated Oct. 16, 2019, 58 pages.

European Patent Application No. 17853932.6, Extended European Search Report dated Feb. 21, 2020, 12 pages.

Qing Yao et al: "Application of Support 1-15 Vector Machine for Detecting Rice Diseases Using Shape and Color Texture Features", Engineering Computation, 2009. ICEC 109. International Conference on, IEEE, Piscataway, NJ, USA, May 2, 2009 (May 2, 2009), pp. 79-83, XP031491490,ISBN: 978-0-7695-3655-2 * the whole document*.

Shah Jitesh P. et al: "A survey on detection and classification of rice plant diseases", 2016 IEEE International Conference on Current Trends in Advanced Computing (ICCTAC), IEEE, Mar. 10, 2016 (Mar. 10, 2016), pp. 1-8, XP032960803, DOI: 10.1109/ICCTAC.2016.7567333 [retrieved on Sep. 13, 2016] *abstract* *Sec.VII* * Sec. V* * figure.

U.S. Appl. No. 15/271,749, Final Office Action dated Mar. 16, 2020, 52 pages.

U.S. Appl. No. 15/271,727, Non Final Office Action dated Feb. 4, 2020, 62 pages.

U.S. Appl. No. 15/271,749, Non-Final Office Action dated Sep. 11, 2020, 63 pages.

U.S. Appl. No. 16/859,891, Non-Final Office Action dated Sep. 14, 2020, 40 pages.

European Patent Application No. 17853934.2, Office Action dated Nov. 11, 2020, 7 pages.

U.S. Appl. No. 15/271,727, Final Office Action dated Nov. 2, 2020, 36 pages.

U.S. Appl. No. 15/271,658, Non-Final Office Action dated Sep. 19, 2018, 10 pages.

U.S. Appl. No. 16/859,891, Final Office Action dated Feb. 19, 2021, 32 pages.

* cited by examiner

AUGMENTED REALITY BASED HORTICULTURAL CARE TRACKING

CROSS-REFERENCE TO RELATED APPLICATIONS

This application is related to co-pending application Ser. No. 15/271,569, filed Sep. 21, 2016, entitled "Hi-Fidelity Computer Object Recognition Based Horticultural Feedback Loop," which is hereby incorporated by reference in its entirety. This application is also related to co-pending application Ser. No. 15/271,630, filed Sep. 21, 2016, entitled "Horticultural Care Tracking, Validation and Verification," which is hereby incorporated by reference in its entirety.

BACKGROUND

A horticultural operation generally includes planting, cultivation and the harvesting of plants. Large-scale horticultural operations may include multiple grow operations in multiple locations with staff with widely varying capabilities. A master grower, responsible for a large-scale horticultural operation, is faced with many challenges to collect actionable information about plants and grow operations in his or her care, to identify issues, to identify remedial courses of action, and to dispatch those courses of action to workers.

One challenge is to collect and share information in a timely and effective fashion. Present operations are generally manual, inconsistent, and slow to collect, let alone aggregate in a fashion conducive to developing a remedial course of action. Even if a course of action is developed, dispatching the course of action to workers with widely differing capabilities present additional challenges.

Additionally, it is also crucial to not only track remedial courses of action, but also to verify that a course of action has been properly performed and to determine the efficacy of that course of action. Accordingly, there are many challenges to implement and manage a truly accountable horticultural operation.

BRIEF DESCRIPTION OF THE DRAWINGS

The detailed description is set forth with reference to the accompanying figures.

DETAILED DESCRIPTION

Example Architecture

Figure 1:
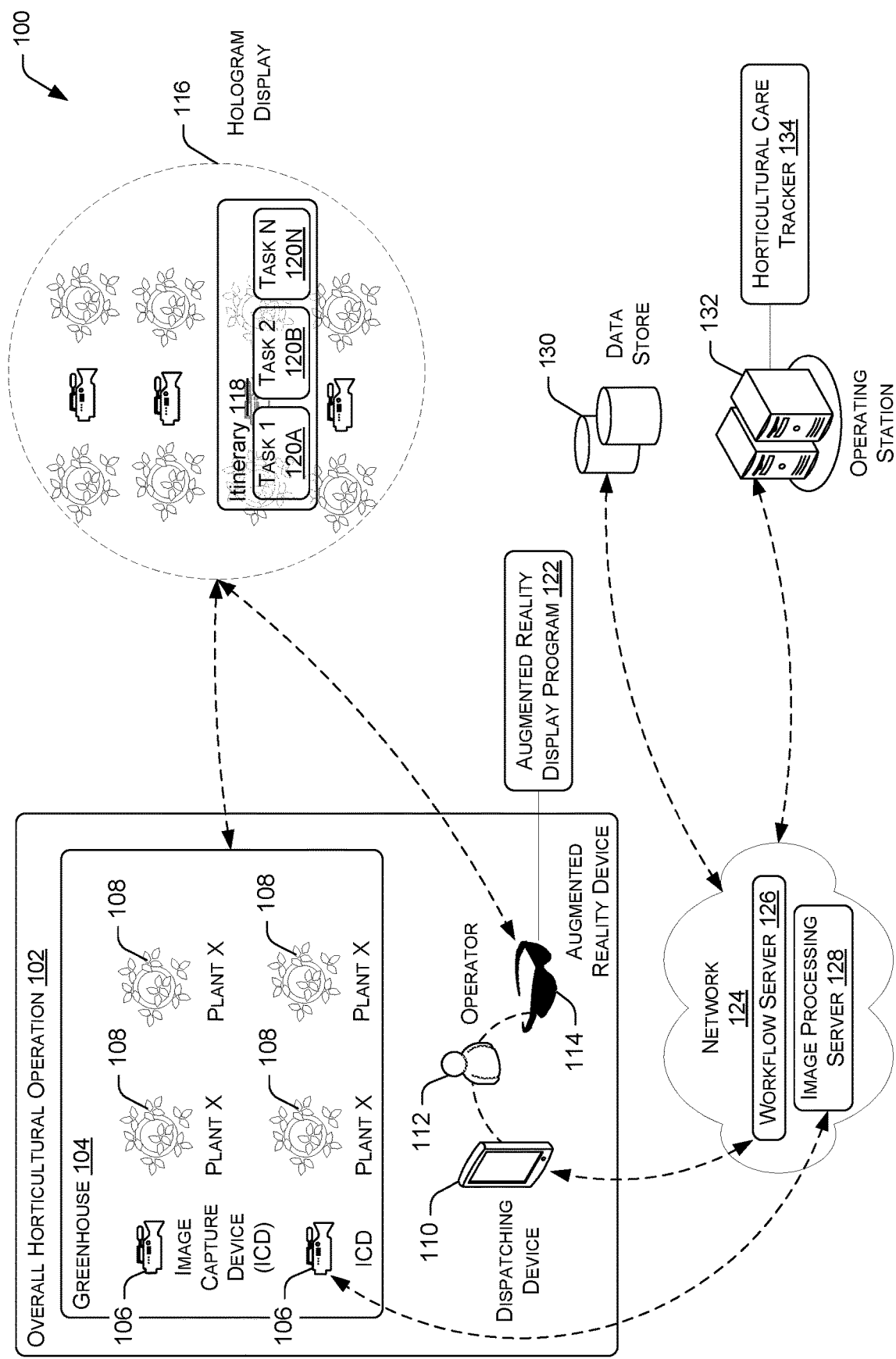
FIG. 1 is an example architecture for implementing augmented reality-based horticulture tracking.

FIG. 1 depicts a context diagram 100 of an exemplary horticultural operation 102 instrumentation for automated informational and operational management. With this instrumentation and other disclosed infrastructure, horticultural care tracking, validation, and verification are enabled.

A horticultural operation 102 may have several locations and can work in conjunction with other horticultural operations, depending upon embodiments. Each horticultural operation 102 comprises a plurality of greenhouses 104. It is noted that the greenhouses need not be physically proximate to each other. They are related in that they are under the responsibility of the horticultural operation 102, which may be owned by a single company. Additionally, the greenhouses 104 need not actually be greenhouses in a conventional sense, but may also be any location or facility where plants are grown such as an open field, a hydroponic operation, and/or so forth.

A greenhouse 104 may have multiple grow operations, for example, different grow operations for different type of plants. However, each grow operation may also have more than one type of plants under care. Grow operations can be generally in the same location or organized by a logical construct. For example, a first grow operation can be sited entirely within a first greenhouse and a second grow operation can be sited entirely within a second greenhouse. However, a third grow operation can be partially sited within a first greenhouse and partially sited within a second greenhouse. In this regard, each greenhouse can house multiple types of plants 108.

As part of instrumentation, each plant 108, or substantially each plant 108 may have its own image capture device (ICD) 106. An image capture device may be a digital video camera or alternatively a digital still camera configured to capture images periodically. Because of the automated nature of digital video and/or digital still cameras, it is possible to economically deploy image capture devices 106 on a per plant or substantially per plant basis, if needed.

Generally, an image capture device 106 may take visible light spectra pictures, but may also extend to non-visible spectra such as infrared and ultraviolet. The image capture device 106 may have an on-board application programming interface (API) enabling programmatic control. Alternatively, the image capture device 106 may be networked to enable remote control, for example, from an operating station 132.

The image capture device 106 may be part of a larger suite of sensors networked to a data capture function which upload plant, telemetry, media, and other data such as plant or environmental health status to an image processing server 128, the operating station 132, a workflow server 126, and/or an intermediate server in the network 124. For example, sensors may collect telemetry on a per plant or substantially per plant basis. Without limitation, sensors may include light meters, water meters, potential of hydrogen (pH) acid/alkali meters, and the like. It is noted that any sensor that may be connected to a standard computer input/output interface may be added.

Some telemetry from sensors will be the sensor readings themselves. Some telemetry may be calculated from sensor measurements. Thus, not all telemetry collected is image based. For example, a light meter may measure light intensity for that moment of time. However, an extrapolation calculation may estimate the daily light integral, which is the total light applied to a plant over a given time period. Another telemetry from different sensors may also be combined. For example, a light meter may provide a measurement of the amount of light over time and an oxygen sensor may measure an amount of $O_2$ generated by a plant over time. From these two measurements, the photosynthetic efficiency measurements, such as the relative photosynthesis index may be calculated. Telemetry from sensors may be combined with outside information. For example, a sensor providing telemetry for the amount of vapor in the air may be combined with the water saturation point, to calculate the vapor pressure deficit. The vapor pressure deficit is the difference between the amount of water in the air and the amount of water the air can hold if saturated.

As noted above, the image capture device 106 is configured to capture an image of interest. In various embodiments, the image capture device 106 can capture images of interest over a period of time to create a time lapse, which would enable an operator to analyze an identified target (e.g., a plant 108) over its lifetime. The image of interest comprises an image with an identified target (e.g., a plant 108), an image with an identified artifact of the target, and an image potentially associated with an identified issue record. An issue record is any representation, usually in a text, that describes an anomaly in the target/plant and/or an anomaly related to the target/plant. An issue record may also include information about the likely severity of the issue, thereby aiding in ranking issues by priority. An issue record may also include annotation information (e.g., information pertaining to the health of a plant 108 and/or its surrounding environment) provided by administrative personnel at the operating station 132 and/or operators 112 on site. In some embodiments, annotations can include past and current information pertaining to the target/plant. Annotations may be stored separately, but associated with the respective image and/or issue record. Annotation information can comprise any information added to an image. For example, annotations may simply be markers such as "pin drop" or a "book mark" where a marker is placed on an image to enable finding the image again quickly. Other annotations may be graphical marks on the image, such as circling artifacts or adding notes. Yet other annotations may be text commentary.

The image capture device 106 is configured to upload captured images, annotations, and/or other data to the image processing server 128, the workflow server 126, a server or a terminal at the operating station 132, and/or an intermediate server in the network 124. The servers can comprise any computing device with a processor, a memory, and a network interface that may participate in a network. The network 124 may be, without limitation, a local area network ("LAN"), a virtual private network ("VPN"), a cellular network, a cloud, the Internet, and/or so forth.

The image processing server 128 is configured to perform image analysis of images of interest in order to recognize images, annotations, and/or other data, automatically detect issues in plants, and detect other issues related to grow operations. In various embodiments, upon receiving an image, the image processing server 128 can identify a target, an artifact of the target, and/or an identified issue record within the received image and classify the target, the artifact of the target, and/or the identified issue record to rank and sort the image. Based at least partially on the received image, the image processing server 128 can associate the image with an issue record in order to retrieve corresponding recommended courses of action to remediate the detected issue and other relevant data. In this way, for instance, the image processing server 128 can assess the health of a plant in a grow operation and provide care recommendations to an operator on site. In various embodiments, the image processing server 128 can also associate the image with an issue record in order to retrieve corresponding recommended courses of action previously taken or attempted to remediate other previous issues or the same issue detected. In this way, certain courses of actions can be ruled out if they were previously unsuccessful in remedying the issues or led to subsequent issues. Alternatively, certain courses of actions can be reattempted if they were previously successful in remedying the issues or similar issues.

In various embodiments, the operating station 132 may process image data received by one or more sensors that can be independent and/or inclusive of an augmented reality device 114. In doing so, the operating station 132 may identify particular plants 108, identify issues associated with those plants 108, and determine corresponding courses of action. The operating station 132 may further cause an augmented reality device 114 to display a marker that aligns with an identified plant 108 when the identified plant 108 is within a field of view of the augmented reality device 114. The marker may selectively identify the plant 108, the issue, and/or display a course of action to resolve the identified issue.

The workflow server 126 handles the coordination of information to different servers (i.e., the image processing server 128, the operating station 132, etc.) and users/operators. The image processing server 218 makes available the images and results of the image processing analysis to the workflow server 126, to administrative personnel at an operating station 132 responsible for overseeing the horticultural operation 102, and/or an operator 112, responsible for a subset of the grow operations and reporting to the operating station 132. Administrative personnel can manually review the state of plants within the horticultural operation 102, identify issues, and direct remedial courses of action to address those identified issues, depending upon embodiments.

In various embodiments, the workflow server 126 may create an issue record automatically by performing image processing on an image. Thus, the workflow server 126 is also configured to identify issues in plants and other issues related to grow operations based at least partially on received images from an image capture device 106. In this way, the functionalities of the workflow server 126 and the image processing server 128 can overlap at least in part so as to provide redundancy and failover. In addition to identifying issues, the workflow server 126 may also store a table of remediation courses of action associated with the issues, depending upon embodiments. In this way, where an issue record is associated with an image, the issue record may be used to query the workflow server 126 for at least one remediation course of action, wherein the remediation course of action can be a previously attempted remediation course of action or a new remediation course of action.

Upon the association of an issue record with an image and the association of the issue record with at least one remediation course of action, the workflow server 126 may send a message or a notification comprising a description of the issue (e.g., in a plant) and other information (e.g., related telemetry and/or media, previous attempts/courses of actions to remedy other or same issues, etc.) to the operating station 132.

The workflow server 126 can also make images and/or annotations available to administrative personnel at the operating station 132 on demand so that an administrative person can browse images and/or annotations and create an issue record at the operating station 132. In various embodiments, the operating station 132 comprises a horticultural care tracker 134 that provides software components to provide augmented reality based horticultural care tracking functions.

Upon the administrative person selecting or specifying a remedial course of action to address the identified issue, the horticultural care tracker 134 can generate an itinerary 118 comprising a task list to send to an operator's 112 dispatching device 110 and/or augmented reality device 114 to instruct the operator 112, to perform the remedial course of action. In this regard, the remedial course of action comprises one or more tasks 120A-120N that make up the task list. Each task 120A-120N in the itinerary 118 can be displayed on the augmented reality device 114 such that information related to each of the task 120A-120N appears as an overlay to a real environment or a hologram display 116. This allows operators 112 to perform tasks in a more convenient and intuitive manner as the augmented reality device 114 makes information more readily available and removes the need to look down or picking up or putting down a dispatching device 110. In various embodiments, operators 112 can also view a time lapse of a plant in a grow operation as an overlay or a hologram display 116 to gain a better understanding of an identified issue before completing a task. Additionally, it is noted that the overlay or a hologram display 116 can be turned on or off via the augmented reality device 114 depending on an operator's preferences.

In various embodiments, the workflow server 126 can automatically select an operator 112 with qualifications to perform the remediation course of action. Where there are multiple operators to perform the remediation course of action, the workflow server 126 can automatically schedule the remediation course of action to the first available operator or to the operator with the smallest workload. In various embodiments, operators can pass off or reassign tasks to other operators, for example, if an operator is no longer able to complete an assigned task. Thus, the horticultural tracker 134 can send specific itineraries 118 containing certain tasks 120A-120N to specific operators' 112 dispatching devices 110 and/or augmented reality devices 114. Upon receiving an itinerary 118 at the dispatching device 110 and/or the augmented reality device 114, the operator 112 then performs the tasks 120A-120N as specified in the itinerary and may send a notification indicating completion of all of the tasks 120A-120N. In some cases, the operator 112 may also provide some annotations to associate with the notification indicating completion, which the workflow server 126 may then make available to the administrative personnel to review at the operating station 132. In some cases, the operator 112 may identify additional issues identified during a performance on the dispatching device 122 and/or the augmented reality device 114. In other cases, the operator 112 can delegate certain tasks 120A-120N to another operator 112. In this regard, it is contemplated that multiple operators 112 can communicate with each other, for example, via the dispatching devices 110 and/or augmented reality devices 114. The dispatching devices 110 and/or augmented reality devices 114 can be configured to, for example, allow screen sharing so as to enable multiple users or operators to view and share experiences on site while working.

In various embodiments, an operator 112 wearing an augmented reality device 114 may identify an issue with a particular plant 108 that is viewed through the augmented reality device 114. In one example, the operating system may not have previously identified the issue. Thus, the operator 112 may transmit a user input to the operating station 132 via the augmented reality device 114 or another peripheral device. In doing so, the operating station 132 may capture image data from the augmented reality device 114 and/or other independent sensors, process the image data, and dynamically, in real-time, display a marker that aligns with the identified plant 108 while the identified plant 108 is within the field of view of the augmented reality device 114. The marker may selectively identify the particular plant 108, the identified issue, and a corresponding course of action.

The dispatching device 110 is generally a mobile device or another type of handheld network-enabled electronic device such as a laptop, a tablet computer, and/or a cell phone. As with any computing device, the dispatching device 110 comprises a processor, a memory, and a network interface with analogous characteristics to the servers as described above. The dispatching device 110 may also include one or more input/output interface such as a touch screen display. The dispatching device comprises 110 software components to receive, analyze, and report status updates or other information, communicate with administrative personnel at the operating station 132, and analyze and diagnose potential issues in plants and horticultural operations.

The augmented reality device 114 or a head mounted display can comprise a wearable device such as a headset, goggles, or glasses that is configured to provide a hologram display or holographic images. The augmented reality device 114 can work in conjunction with the dispatching device 110 or as a standalone device. For example, the dispatching device 110 can remotely control the augmented reality device 114, depending upon embodiments. In various embodiments, the augmented reality device 114 comprises a wearable mount having a display processor, one or more sensors such as cameras and gesture sensors (i.e., for detecting a wearer's bodily movements such as hand gestures), and user input controls that are operatively connected to one or more displays that is disposed in front of an operator's eyes. The cameras are configured to receive real environment input surrounding the operator 112 and the display processor overlays real scenes captured via the cameras with information (e.g., notifications, dispatches, courses of action, graphical indicia, telemetry—including, without limitation, vapor pressure deficit, daily light integral and relative photosynthesis index, etc.) for display on the one or more displays in an augmented reality mode. In this regard, one or more holographic optical elements can be used. An operator 112 can view tasks and related information via a hologram display 116 on the augmented reality device 114. Additionally, an operator 112 can view a plant health indicator of a plant and a time lapse of a plant over its lifetime, wherein the plant health indicator and time-lapse can be displayed as an overlay to a real environment or a hologram display. It is noted that the overlay and the hologram display can be turned on and off manually by an operator. By using a hologram display 116, an administrative person at the operating station 132 can clearly communicate with an operator 112 where an issue has occurred, if any, and how to address the issue.

The image processing server 218, the workflow server 126, and the operating station 132 may have access to a data store 130 (e.g., a file server, a network-aware storage, a database, etc.), either integrated or accessible via network such that images and/or annotations can be stored in a relational database in an image table, issue records can be stored in an issue table, and remediation courses of action can be stored in a solutions table. A cross-reference table relating images to issues would then store associations of images to issues, and another cross-reference table relating issues to one or more courses of action would store associations of issues to remediation courses of action. Alternatively, images and/or annotations may store a pointer to an issue record and one or more courses of action as part of the image.

Exemplary Computing Device Components

Figure 2:
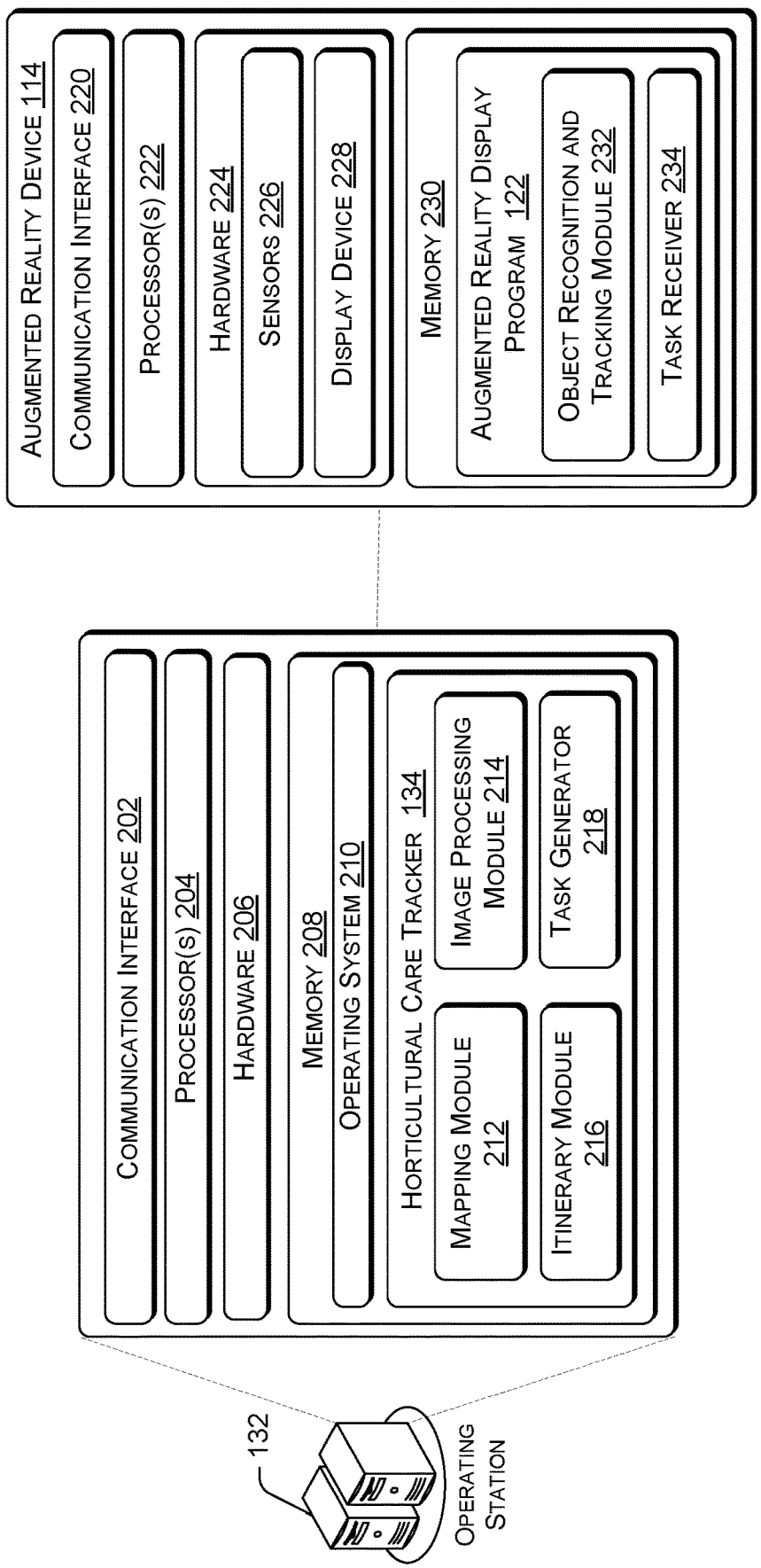
FIG. 2 is a block diagram showing various components of an illustrative computing device that implements the augmented reality-based horticulture tracking.

Prior to disclosing augmented reality-based horticultural care tracking, validation and verification and related techniques, an exemplary hardware, software and communications environment are disclosed. FIG. 2 illustrates several possible embodiments of hardware, software and communications environment for augmented reality based horticultural care tracking, validation and verification related techniques.

Operating Station

The augmented reality-based horticultural care tracking function as described herein is generally hosted on a computing device at an operating station 132. Exemplary computing devices include without limitation personal computers, laptops, embedded devices, tablet computers, smartphones, and virtual machines. In many cases, computing devices are to be networked.

The computing device for the augmented reality-based horticultural care tracking function may have a communication interface 202, one or more processors 204, hardware 206, and a memory 208. The communication interface 202 may include wireless and/or wired communication components that enable the computing device to transmit data to and receive data from other networked devices. The processor 204 may be a central processing unit, a repurposed graphical processing unit, and/or a dedicated controller such as a microcontroller.

The hardware 206 may include a user interface, data communication, data storage hardware, input/output (I/O) interface, and/or a network interface. For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices. The I/O interface may be any controller card, such as a universal asynchronous receiver/transmitter (UART) used in conjunction with a standard I/O interface protocol such as RS-232 and/or Universal Serial Bus (USB). The network interface may potentially work in concert with the I/O interface and may be a network interface card supporting Ethernet and/or Wi-Fi and/or any number of other physical and/or data link protocols. Accordingly, sensors may interface with the telemetry capture function via a connected port, serial or parallel, and/or via networking.

Memory 208 is any computer-readable media which may store several software components including an operating system 210 and software components such as an augmented reality-based horticultural care tracker and/or other applications. In general, a software component is a set of computer executable instructions stored together as a discrete whole. Examples of software components include binary executables such as static libraries, dynamically linked libraries, and executable programs. Other examples of software components include interpreted executables that are executed on a run time such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanisms. As defined herein, computer storage media does not include communication media.

The horticultural care tracker 134 is a software component responsible for identifying issues and generating itineraries comprising task lists that include courses of actions for each identified issue in order to track and manage grow operations. The horticultural care tracker 134 comprises a mapping module 212, an image processing module 214, an itinerary module 216, and a task generator 218. The image processing module 214 is configured to receive images of interest and other associated data from the workflow server, the image processing server, and/or other intermediary servers in the network. In some embodiments, the image processing module 214 can automatically request images from the workflow server 126, for example, at regular intervals. The image processing module 126 enables an administrative person at the operating station 132 to browse images and/or annotations to review or analyze environmental or plant health data and to create an issue record. Alternatively, the image processing module 126 can automatically process received images in order to associate images with issue records.

The mapping module 212 is configured to retrieve a map of each greenhouse in a horticultural operation, for example, from an image processing server, a data store, and/or so forth. The mapping module 212 can also communicate with the augmented reality device 114 and/or a dispatch device in order to generate a map of the operator's surroundings (i.e., in a greenhouse) and determine an operator's location (i.e., based on the location of the augmented reality device and/or the dispatch device) within the greenhouse in real time. The task generator 218 is configured associate a remedial course of action to address the identified issue, thereby generating tasks for an operator to perform. In this regard, the task generator 218 can query the workflow server or another source for at least one remediation course of action. Alternatively, the task generator 218 can receive input from an administrative person selecting or specifying a remedial course of action to address the identified issue.

The itinerary module 216 is configured to create an itinerary for an operator based on all of the outstanding tasks generated via the task generator 218. The itinerary module 216 is also configured to collect or provide information pertaining to the task list so as to provide the operator with all of the pertinent information to complete the tasks in the task list. For example, the itinerary module 216 is configured to provide a list of tools or equipment needed to complete some or all of the tasks in the task list. Additionally, the itinerary module 216 can work in conjunction with the mapping module 212 in order to provide any location-specific information to the operator. For example, the itinerary module 216 can reorder the tasks in the task list based on the operator's real-time location. Additionally, the itinerary module 216 can provide specific graphical indicia or icons (e.g., arrows indicating direction of travel, arrows indicate particular plants or areas in the greenhouse) as an overlay based on the operator's location information received from the mapping module 212. The foregoing information can be presented in a hologram display on the augmented reality device so that the information is readily visible and accessible to the operator. Additionally, receiving information via a hologram display on the augmented reality device allows operators to perform work in a hands-free manner.

In various embodiments, the itinerary module 216 is configured to receive input from the operator to receive status updates or notifications, wherein the operator can provide the status updates or notifications via the dispatching device and/or the augmented reality device. The status updates or notifications can comprise images, texts, annotations, or other types of data. In this way, the operator can notify the operating station 132, for example, when a task has been completed or additional issues were identified and a task could not be completed. Where a task is not completed, the itinerary module 216 can include incomplete tasks for future itineraries.

In various embodiments, the itinerary module 216 can order or sort tasks in order of priority when generating an itinerary. In this regard, each task can be assigned a priority level, wherein tasks with a high priority level can be ranked towards the top of the task list and tasks with a low priority level can be ranked towards the bottom of the task list. For example, tasks with an impending deadline can be assigned a high priority level so that they are completed first. Additionally, tasks that address severe issues can be assigned a high priority level. In another example, routine tasks can be assigned a low priority level so that they can be completed after other tasks. Tasks that pertain to material or equipment gathering, for instance, can be ranked toward the top of the list to facilitate completion of other tasks in the task list. For example, for multiple tasks that require the same tool or supply, the operator need only retrieve the tool or supply once at the beginning to eliminate the need to retrieve the tool or supply multiple times.

In various embodiments, the software components can also comprise a data flow controller function for managing the capture of telemetry and receiving images from the image capture device and sensor data streams from sensors. The data controller function can also provide the local management of received images and data, and potentially the transmission of received images and data off of the telemetry capture function over a network. The data flow controller may also manage the transmission of received images and data. Specifically, it may transmit an image or data to a known network location via the network interface. The known network locations may include a server or a cloud/Internet location. Upon transmission, the telemetry flow controller may enlist in notifications to determine that the transmission was successful. The telemetry flow controller may also transmit notifications to other device subscribing to its notifications indicating status of a transmission. Other applications may be utilities to perform image and/or data processing, such as compression and/or encryption. Other utilities may include functions to create data streams based on calculations from telemetry one or more sensors.

Augmented Reality Device

An augmented reality device 114 is any augmented reality device or a head-mounted device that can participate in a network. Generally, the augmented reality device comprises a processor 222 and a memory 230 with analogous characteristics to a host computer or a server at the operating station 132 as described above. The augmented reality device 114 further includes hardware 224 comprising a display device 228 to display output (e.g., hologram display) and sensors 226 to receive user input (e.g., user gestures via a gesture sensor) or environmental input (e.g., real surroundings via a camera). In some embodiments, hardware 224 for input and output may be integrated together. To participate in a network, the augmented reality device 114 further comprises a communication interface 220 such as a network interface. The communication interface 220 allows operators to receive itineraries and notifications from the operating station 132 and to provide status updates, notifications, and feedback. In some embodiments, the communication interface 220 allows operators to communicate with the operating station 132 via an intermediate server such as the workflow server.

The memory 230 of the augmented reality device 114 comprises a number of application components such as an augmented reality display program 122 to support horticultural operation functions. The augmented reality display program 122 comprises an object recognition and tracking module 232 and a task receiver 234.

The task receiver 234 receives itineraries comprising tasks and other information such as notifications from the operating station 132. The tasks in the itineraries and other information are then queued by the task receiver 234. The operator indicates on the dispatching device and/or the augmented reality device 114 when a task is complete, or otherwise provides status. In various embodiments, the operator can indicate via hand gestures to check off a completed task or otherwise provide status updates. The communication interface 220 manages the transmission of task status to the itinerary module 216 at the operating station 132 or the workflow server 126. In some cases, the operator may provide textual, image, and other information about the task. The operator may annotate the task or alternatively an image of interest associated with a task.

Example Processes

Figure 3:
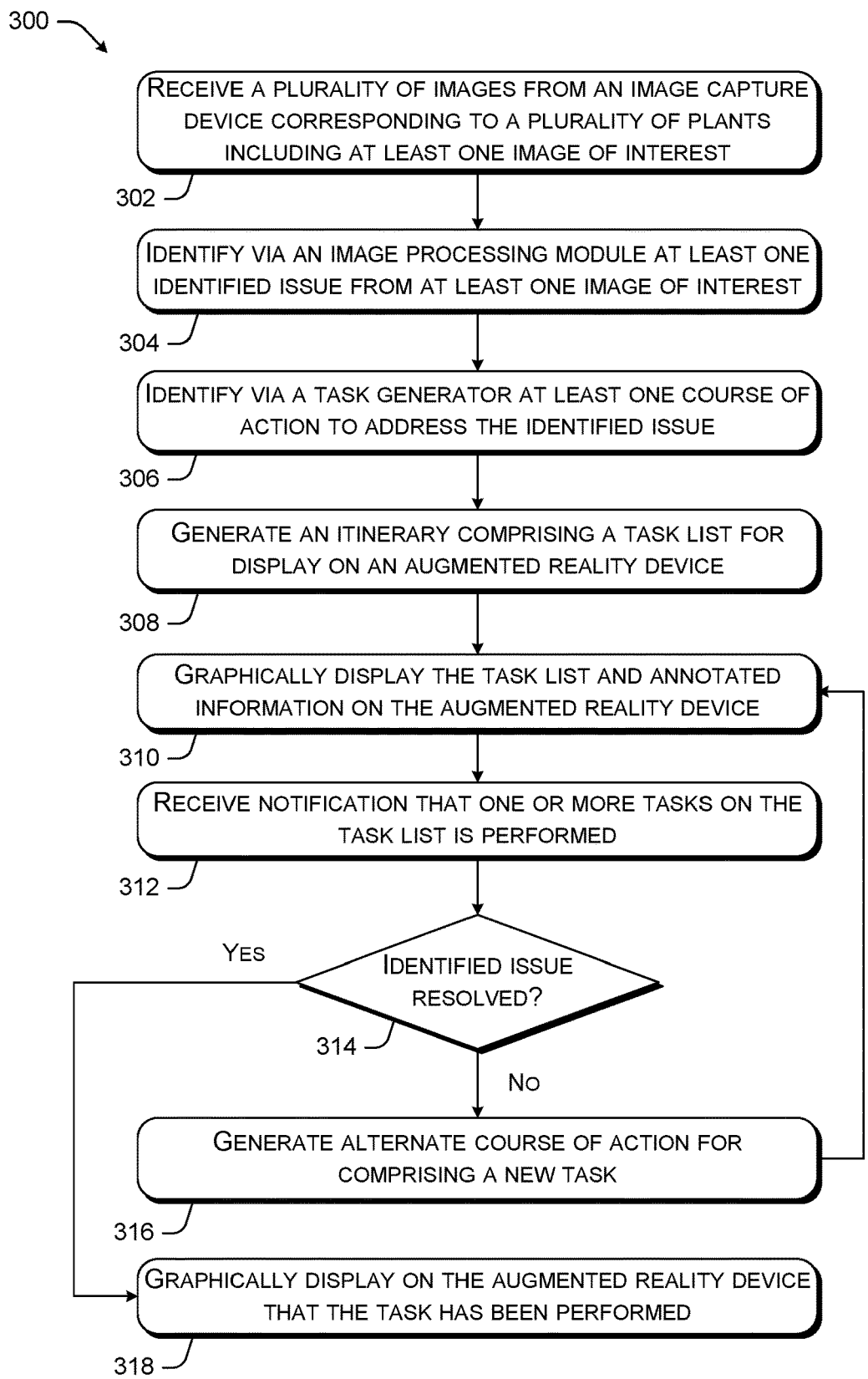
FIG. 3 is a flowchart of an exemplary issue identification and dispatching process for horticultural care tracking using an augmented reality device.
Figure 4:
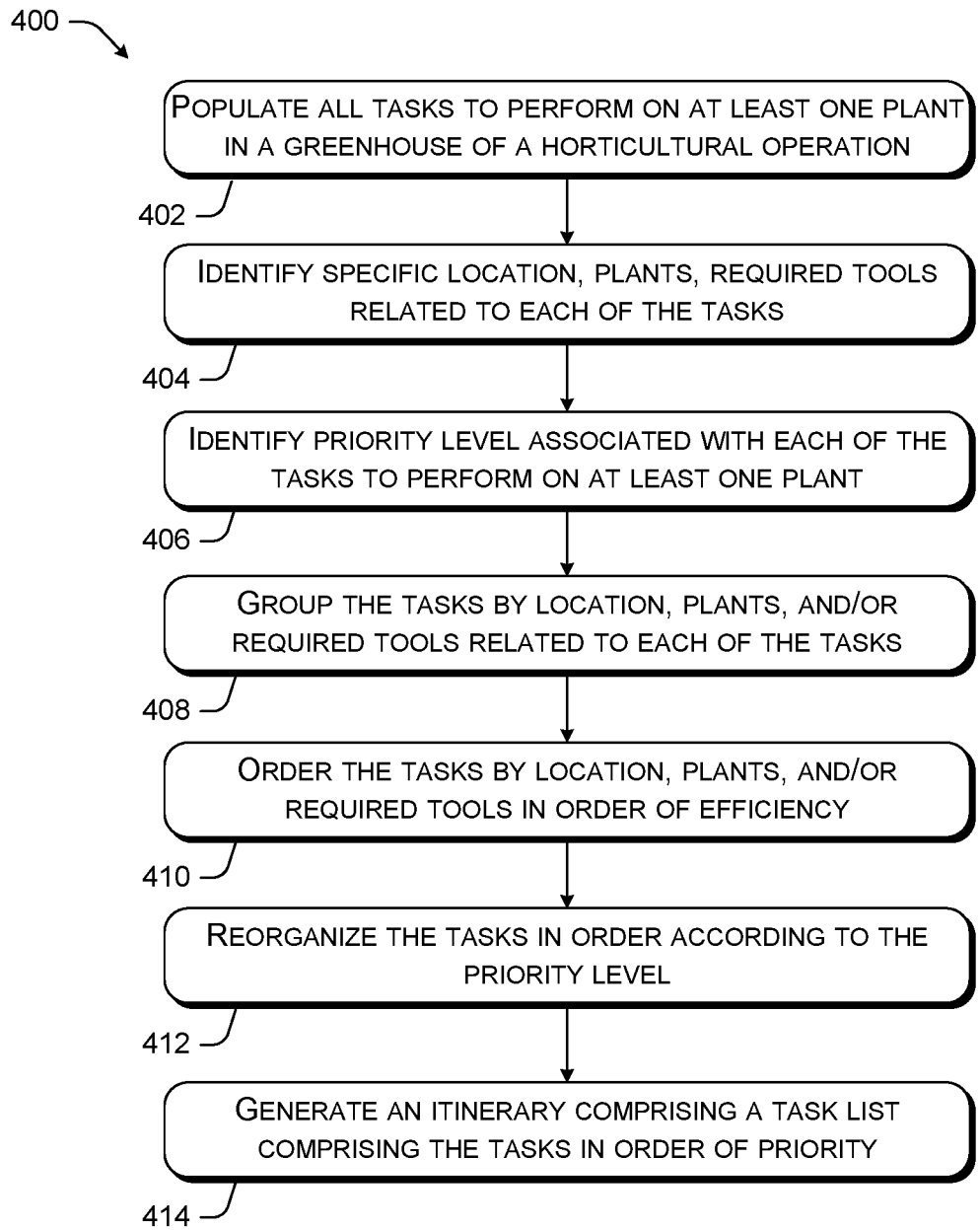
FIG. 4 is a flowchart of an exemplary process for generating an itinerary to manage tasks for horticultural care tracking.
Figure 5:
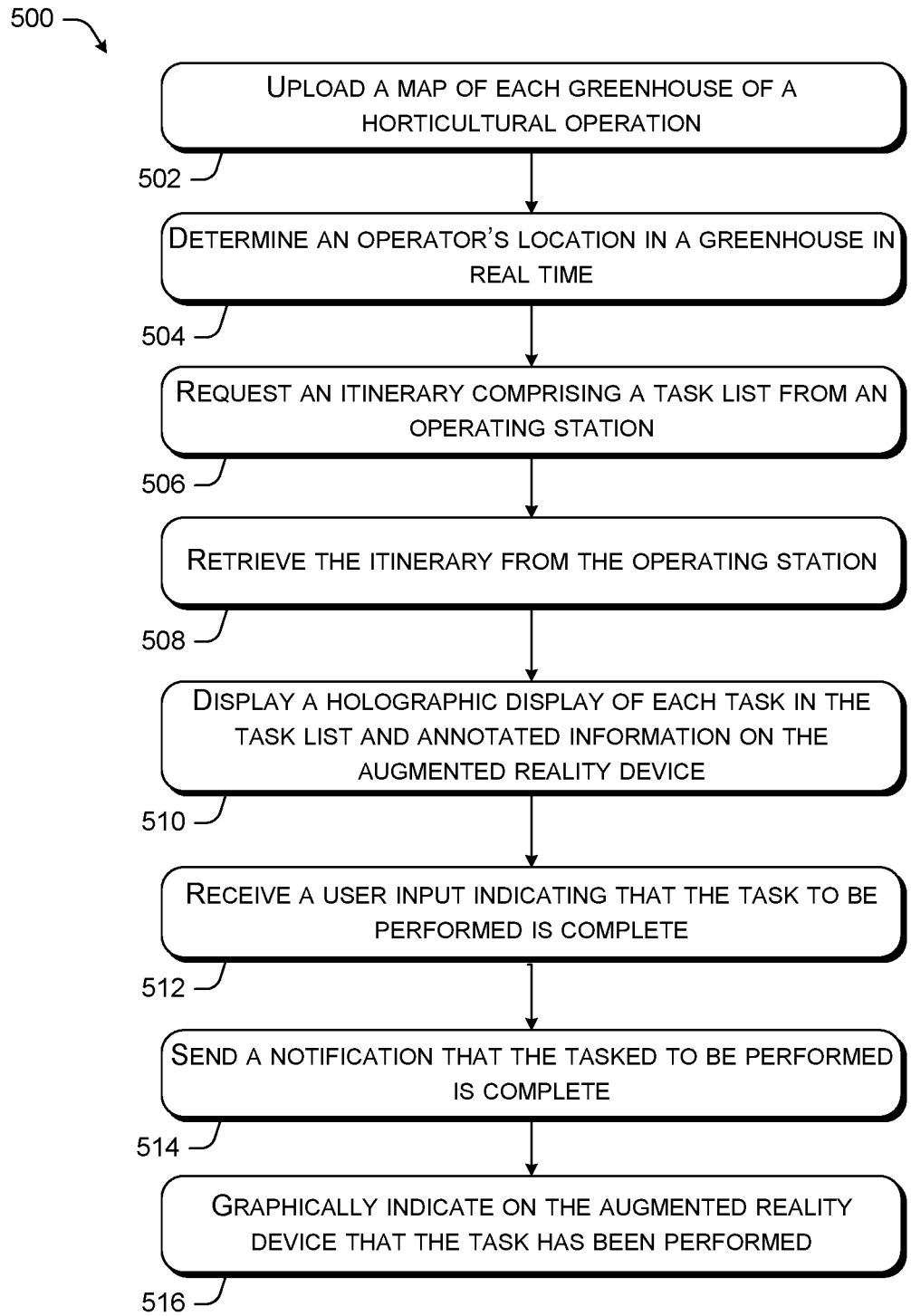
FIG. 5 is a flowchart of an exemplary process for displaying tasks and dispatching information on an augmented reality device.

FIGS. 3 through 5 present illustrative processes 300-500 for augmented reality based horticultural operation tracking and management. Each of the processes 300-500 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. The discussion purposes, the processes 300-500 are described with reference to the architecture 100 of FIG. 1.

FIG. 3 is a flowchart of an exemplary issue identification and dispatching process for horticultural care tracking using an augmented reality device. At block 302, the operating station receives a plurality of images from an image capture device corresponding to a plurality of plants and an artifact of the plurality of plants including at least one image of interest, wherein the image of interest can be associated with an issue record. Additionally, the issue record can be associated with one or more remediation courses of action. In various embodiments, other servers and devices such as the image processing server, the workflow server, the dispatching device, and/or the augmented reality device can also receive a plurality of images of interest. At block 304, the operating station identifies via an image processing module at least one identified issue from at least one image of interest. Thus, an issue is associated with the image displayed. In various embodiments, issues may also be identified from many sources including operators, the workflow server and its automation, and administrative personnel at the operating station. For example, an administrative person may browse through multiple images prior to determination of an issue. Images that are associated with issue records may be ranked by severity of issue via the image processing module.

At block 306, the operating station identifies via a task generator at least one course of action to address the identified issue. Suggested remediation courses of action may also come from many sources, including the workflow server. Additionally, for a particular issue record associated with an image, various sources including the workflow server may be queried for the associated remediation courses of action. However, the decision whether to execute on a remediation course of action generally is done by an administrative person at the operating station. Over time, an administrator may update the list of remediation courses of action. A remediation course of action may comprise one or more tasks.

One, some, or all remediation courses of action, or their constituent tasks, may then be retrieved and provided to the operating station. At block 308, the operating station generates an itinerary comprising a task list for display on an augmented reality device. The tasks included in the task list are sorted in order of priority to allow an operator to address high priority tasks first. In this regard, each task is assigned a priority level, wherein the priority level can comprise a quantitative or numerical value. At block 310, the augmented reality device graphically displays the task list and annotated information in a hologram display. At block 312, the operating station receives notification from the augmented reality device that one or more tasks on the task list is performed. The operating station can receive other types of status updates from the augmented reality device. For example, the status updates can indicate that one or more tasks were not completed, delayed in completion, or that there was a complication. For example, insufficient fertilizer, power outage and the like can prevent the operator from completing a task.

At decision block 314, an administrative person at the operating station can determine whether the identified issue is resolved. To verify that a task was done or done properly, the administrative person from the operating station can request a first image of the subject plant just before the task was reported as done and a second image of the subject plant just after the task was reported as done in order to compare the first image and the second image. Alternatively, a workflow server may work with an image processing server to compare the image prior to the task and the image after the task. If there are no noticeable differences, then either the task was not performed correctly, or was not performed at all. Alternatively, if the plants continue to display artifacts with issues, then the task was not performed or was not effective. The workflow server can communicate with the operating station to relay whether the task was performed correctly or not performed at all. In various embodiments, the operating station can also employ general trend analysis and sequential analysis to determine the efficacy of dispatched tasks and/or courses of action.

If the identified issue is not resolved ("no" response from decision block 314), the operating station generates alternate course of action for the identified issue as indicated in block 316. In this regard, the task generator 218 can query the workflow server for an alternate course of action or receive input from an administrative person. In some embodiments, the operator can specify an alternative course of action and create an annotation. If an alternative course of action is specified, the alternative course of action may be stored in the operating station or the workflow server, and associated with the present issue. The alternate course of action includes one or more new tasks. The new tasks can be performed using annotated information, if any, and the new tasks and any associated graphical indicia can be displayed on the augmented reality device. If the identified issue is resolved ("yes" response from decision block 314), the task can be marked as completed via the augmented reality device as indicated in block 318.

FIG. 4 is a flowchart of an exemplary process for generating an itinerary to manage tasks for horticultural care tracking. At block 402, the operating station populates all tasks generated by the task generator to perform on at least one plant in a greenhouse of a horticultural operation. In some embodiments, the task generator can populate all outstanding tasks in response to a query, for example, from an administrative person, or on a scheduled basis. The task generator can also provide notifications, annotations, or other information relating to those tasks. At block 404, the itinerary module identifies specific location, plants, required tools, and/or so forth related to each of the tasks. At block 406, the itinerary module identifies a priority level associated with each of the tasks to perform on at least one plant. In some embodiments, tasks with deadlines can have a higher priority level than tasks without specific deadlines. Additionally, tasks associated with a severe issue can have a higher priority level.

At block 408, the operating station groups the tasks by location, plants, required tools, and/or so forth related to each of the tasks in order to increase efficiency when completing the tasks. For instance, all tasks related to one greenhouse can be grouped together such that an operator can complete all of the tasks in one greenhouse before traveling to another greenhouse to perform other tasks in the other greenhouse, reducing travel time and inconvenience of traveling back and forth. Additionally, all tasks requiring a single tool or equipment can be grouped together such that an operator can finish using the tool or equipment before putting the tool or equipment away. At block 410, the operating station orders the tasks by location, plants, required tools, and/or so forth in order of efficiency. For example, the tasks can be ordered such that an operator can travel the shortest distance or route to complete the tasks. At block 412, the operating station reorganizes or sorts the tasks in order according to the priority level. More specifically, any tasks that need immediate attention can be moved towards the top of the task list. At block 414, the operating station generates an itinerary comprising a task list comprising the tasks in order of efficiency. An operator receives the itinerary comprising the task list with related information that can be displayed in an augmented reality device.

FIG. 5 is a flowchart of an exemplary process for displaying tasks and dispatching information on an augmented reality device. At block 502, the augmented reality device uploads a map of each greenhouse of a horticultural operation. The map can be retrieved from the mapping module at the operating station or another data source or generated using the cameras disposed on the augmented reality device. At block 504, the augmented reality device determines an operator's current location in a greenhouse so as to map the operator's position on the map in real time and to retrieve appropriate digital overlay to display over the operator's real surroundings. At block 506, the augmented reality device requests an itinerary comprising a task list from an operating station. In some embodiments, the augmented reality device can automatically receive an itinerary from the operating station at regular intervals, for example, on a daily basis. Alternatively, the augmented reality device can receive new itineraries as they are generated from the operating station.

At block 508, the augmented reality device retrieves the itinerary from the operating station. The itinerary comprises a task list with information related to each of the tasks within the task list. At block 510, the augmented reality device displays a holographic display of each task in the task list and annotated information on the augmented reality device. Tasks can be displayed using graphical indicia such as symbols of known tasks, such as watering, pruning, increasing light, and harvesting. The set of icons, or symbols to indicate the various tasks is called an iconographic language. The iconographic language may include numbers and/or values. For example, an icon to water may be accompanied by an indication of the amount of water to use. However, because the tasks do not rely on a primary language, the iconographic language may provide a lingua franca between the administrative personnel and the operators. Additionally, the augmented reality device can display specific graphical indicia based on the operator's location. For example, the augmented reality device can provide direction of travel and arrows to help the operator navigate within a specific greenhouse as greenhouses can vary in layout and construction. At block 512, the augmented reality device receives a user input indicating that a task has been completed. In this regard, the augmented reality device can detect via one or more sensors, the operator's gesture or movement to receive user input.

At block 514, the augmented reality device sends a notification that a task to be performed is complete. In one embodiment, the notification can be sent directly to the operating station or to an intermediate server such as the workflow server that can forward the notification to the operating station. The operating station and/or the workflow server can comprise a notifications subscriber to subscribe to all notifications from the augmented reality device that are associated with an itinerary. At block 516, the augmented reality device can receive user input from an operator to graphically indicate on the augmented reality device that a task has been performed. The operator may also add an annotation by making a gesture or provide input via the dispatching device. Generally, the annotation information is displayed on the augmented reality device either while the annotation information is entered, or soon thereafter. At this point, the annotation information is associated and stored with the relevant itinerary, task, an issue associated with a task, and/or so forth. Completed tasks can also be removed from the task list, change in color, or displayed with a completeness icon such as a checkbox, or some other graphical indicia.

CONCLUSION

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method, comprising:
receiving, from an image capture device (ICD), images of immediate surroundings proximate to an individual operator;
generating a map of an environment in which the individual operator is located based at least on the images of the immediate surroundings;
receiving additional images depicting an identified plant or an identified artifact, wherein at least one of the additional images is an image of interest associated with an identified issue of the identified plant or the identified artifact;
identifying a course of action associated with the identified issue from a solutions table to resolve the identified issue, wherein the course of action comprises one or more tasks;
displaying the one or more tasks on an augmented reality device selected from a plurality of augmented reality devices based at least on the individual operator associated with the selected augmented reality device;
associating the one or more tasks with at least one graphical indicia that is displayed on the selected augmented reality device, wherein the selected augmented reality device comprises the ICD;
receiving a notification from the selected augmented reality device that the one or more tasks is complete;
in response to the notification, determining whether the identified issue is resolved; and
if the identified issue is not resolved, generating an alternate course of action, wherein the alternate course of action includes one or more new tasks, and displaying the one or more new tasks on the selected augmented reality device, wherein the one or more new tasks can be associated with the at least one graphical indicia.

2. The computer-implemented method of claim 1, further comprising:
generating an itinerary comprising a task list that includes the one or more tasks, wherein the one or more tasks is sorted in order of priority, wherein the itinerary is associated with the selected augmented reality device.

3. The computer-implemented method of claim 1, further comprising:
indicating via the at least one graphical indicia on the selected augmented reality device that the one or more tasks is complete.

4. The computer-implemented method of claim 2, further comprising:
assigning a priority level to each of the one or more tasks; and
displaying on the selected augmented reality device the one or more tasks from a highest priority level to a lowest priority level.

5. The computer-implemented method of claim 1, wherein the one or more tasks and the at least one graphical indicia are displayed as an overlay to the environment or a hologram display.

6. The computer-implemented method of claim 1, further comprising:
receiving a request from the selected augmented reality device to reassign the one or more tasks, wherein the selected augmented reality device is a first augmented reality device; and
displaying the one or more tasks on a second augmented reality device selected from the plurality of augmented reality devices, wherein the first augmented reality device and the second augmented reality device are associated with different operators.

7. The computer-implemented method of claim 1, wherein the image of interest comprises annotations associated with the identified issue depicted in the image of interest.

8. The computer-implemented method of claim 1, wherein the at least one graphical indicia is location based.

9. The computer-implemented method of claim 1, further comprising:
   requesting a first image associated with the identified issue of the identified plant or the identified artifact just before the one or more tasks was reported as complete;
   requesting a second image associated with the identified issue of the identified plant or the identified artifact just after the one or more tasks was reported as complete; and
   comparing the first image and the second image to determine whether the identified issue is resolved.

10. A computer-implemented method, comprising:
    receiving, from an image capture device (ICD), images of immediate surroundings proximate to an individual operator;
    generating a map of an environment in which the individual operator is located based at least on the images of the immediate surroundings;
    receiving at least one image of interest depicting an identified artifact of a plant, the at least one image of interest associated with an identified issue of the identified artifact;
    identifying a course of action associated with the identified issue from a solutions table to resolve the identified issue, wherein the course of action comprises individual tasks assigned to the individual operator based on one or more conditions;
    displaying the individual tasks on an augmented reality device of a plurality of augmented reality devices associated with the individual operator, wherein the individual tasks can be associated with at least one graphical indicia;
    receiving annotations from the operator for display on the augmented reality device, wherein the augmented reality device comprises the ICD;
    receiving a notification from the augmented reality device that one or more of the individual tasks is complete;
    in response to the notification, determining whether the identified issue is resolved; and
    if the identified issue is not resolved, generating an alternate course of action, wherein the alternate course of action includes one or more new tasks, and displaying the one or more new tasks on the augmented reality device, wherein the one or more new tasks can be associated with the at least one graphical indicia.

11. The computer-implemented method of claim 10, further comprising:
    generating an itinerary comprising a task list that includes individual tasks;
    assigning a priority level to the individual tasks; and
    displaying, on the augmented reality device, a list of the individual tasks from a highest priority level to a lowest priority level.

12. The computer-implemented method of claim 11, wherein the assigning comprises:
    identifying locations where the individual tasks are to be performed;
    grouping the individual tasks by the locations; and
    assigning the priority level to the individual tasks based at least on the grouping.

13. The computer-implemented method of claim 10, further comprising:
    receiving a request from the augmented reality device to reassign the individual tasks, wherein the augmented reality device is a first augmented reality device; and
    displaying the individual tasks on a second augmented reality device, wherein the first augmented reality device and the second augmented reality device are associated with different operators.

14. The computer-implemented method of claim 10, wherein the one or more of the individual tasks and the at least one graphical indicia are displayed as an overlay to the environment or a hologram display.

15. A system, comprising:
    a first augmented reality device;
    a second augmented reality device
    one or more non-transitory storage mediums configured to provide stored computer-readable instructions, the one or more non-transitory storage mediums coupled to one or more processors, the one or more processors configured to execute the computer-readable instructions to cause the one or more processors to:
    receive images of immediate surroundings proximate to an individual operator;
    generate a map of an environment in which the individual operator is located based at least on the images of the immediate surroundings;
    receive an image of interest depicting an identified plant or an identified artifact, wherein the image of interest is associated with an identified issue of the identified plant or the identified artifact;
    identify a course of action associated with the identified issue from a solutions table to resolve the identified issue, wherein the course of action comprises one or more tasks assigned to the individual operator;
    display the one or more tasks on the first augmented reality device associated with the individual operator, wherein the one or more tasks can be associated with at least one graphical indicia;
    receive a notification that the one or more tasks is complete;
    in response to the notification, determine whether the identified issue is resolved;
    if the identified issue is not resolved, generate an alternate course of action, wherein the alternate course of action includes one or more new tasks assigned to an additional operator, and display the one or more new tasks on the second augmented reality device associated with the additional operator, wherein the one or more new tasks can be associated with the at least one graphical indicia; and
    if the identified issue is resolved, indicate on the first augmented reality device and the second augmented reality device that the one or more tasks is complete.

16. The system of claim 15, wherein the first augmented reality device and the second augmented reality device are configured to screen share.

17. The system of claim 15, wherein the first augmented reality device and the second augmented reality device are configured to display the one or more tasks and the at least one graphical indicia as an overlay to the environment or a hologram display.

18. The system of claim 15, wherein the one or more processors is further configured to:
    receive a request from the first augmented reality device to reassign the one or more tasks;

reassign the one or more tasks to the additional operator; and display the one or more tasks on the second augmented reality device associated with the additional operator.

19. The system of claim 15, wherein the one or more processors is further configured to:

generate an itinerary comprising a task list that includes the one or more tasks, wherein the one or more tasks is sorted in order of priority, wherein the itinerary is associated with the first augmented reality device.

20. The system of claim 15, wherein the one or more processors is further configured to:

indicate via the at least one graphical indicia on the first augmented reality device that the one or more tasks is complete.

* * * * *